United States Patent [19]
Kawada et al.

[11] 3,935,644
[45] Feb. 3, 1976

[54] GYROCOMPASS

[75] Inventors: Shin-ichi Kawada; Takeshi Hojo, both of Yokohama, Japan

[73] Assignee: Kabushiki Kaisha Tokyo Keikio, Tokyo, Japan

[22] Filed: Feb. 9, 1973

[21] Appl. No.: 331,257

[30] Foreign Application Priority Data
Feb. 12, 1972  Japan.............................. 47-15134

[52] U.S. Cl................................. 33/324; 74/5.6 D
[51] Int. Cl.². ........................................ G01C 19/38
[58] Field of Search ............. 33/327, 326, 324, 325; 74/5.6 D

[56] References Cited
UNITED STATES PATENTS
3,451,139   6/1969   Kawada .............................. 33/324
3,522,736   8/1970   Hojo et al........................... 74/5.6 D
3,596,366   8/1971   Kawada ................................ 33/327

Primary Examiner—William D. Martin, Jr.
Attorney, Agent, or Firm—Hill, Gross, Simpson, Van Santen, Steadman, Chiara & Simpson

[57]  ABSTRACT

A gyrocompass having a gyro rotor, and a device for applying to the gyro rotor about its vertical axis a torque in proportion to an inclination angle of the spin axis of the gyro rotor from a horizontal plane so as to attenuate the north-seeking action of the gyro rotor, in which the torque is controlled to be proportional to the inclination angle for its component which varies with a period same or close to that of the north-seeking action while to be approximately zero for a component of the inclination angle which does not vary.

9 Claims, 17 Drawing Figures

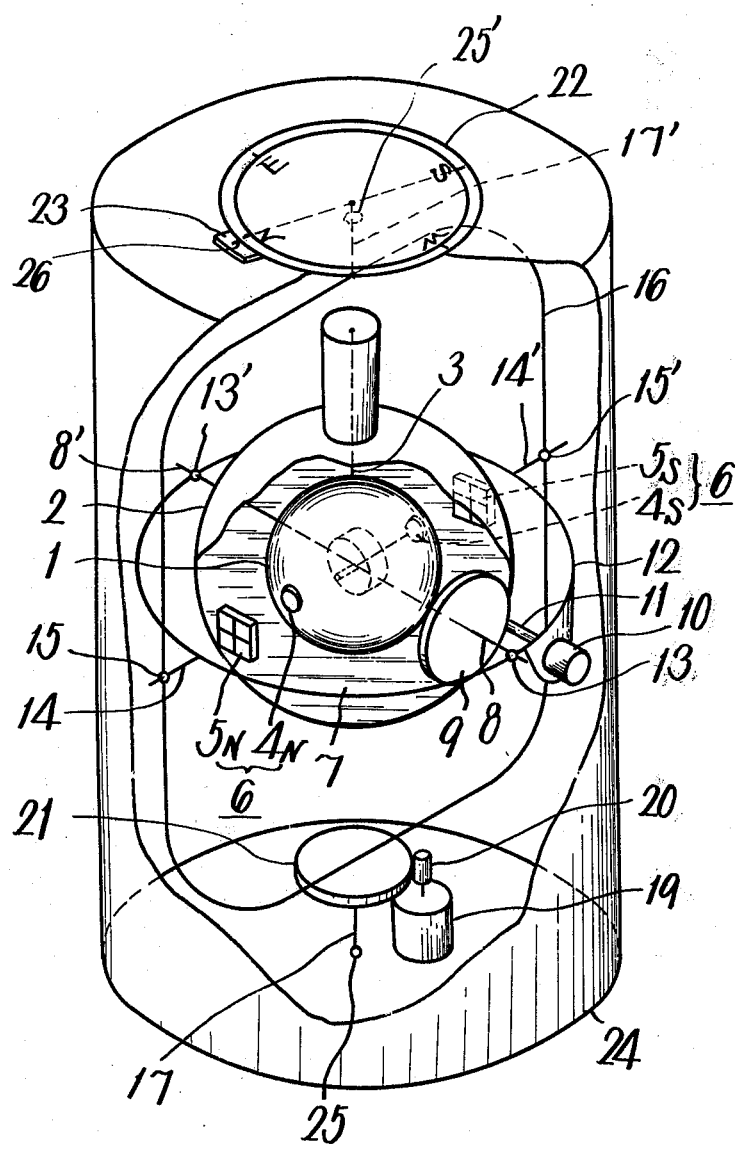

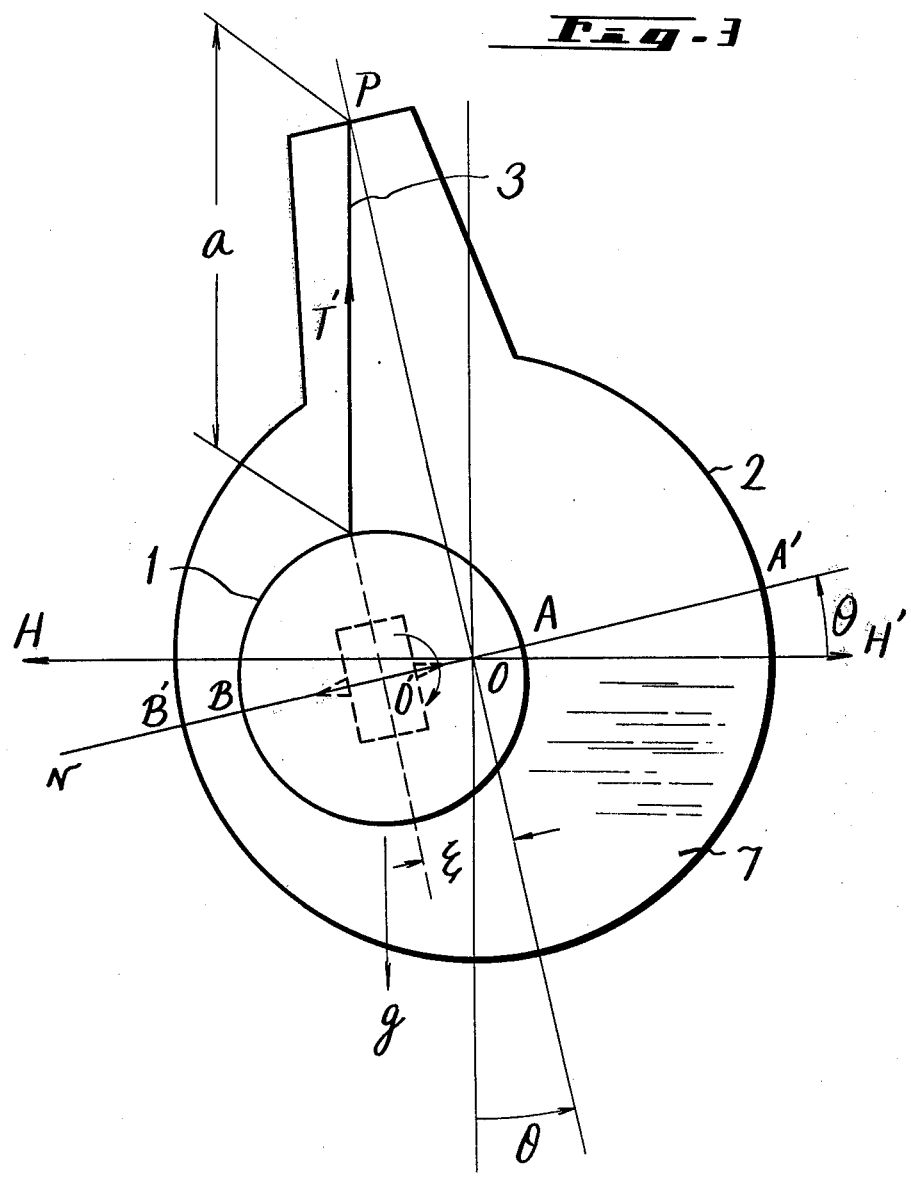

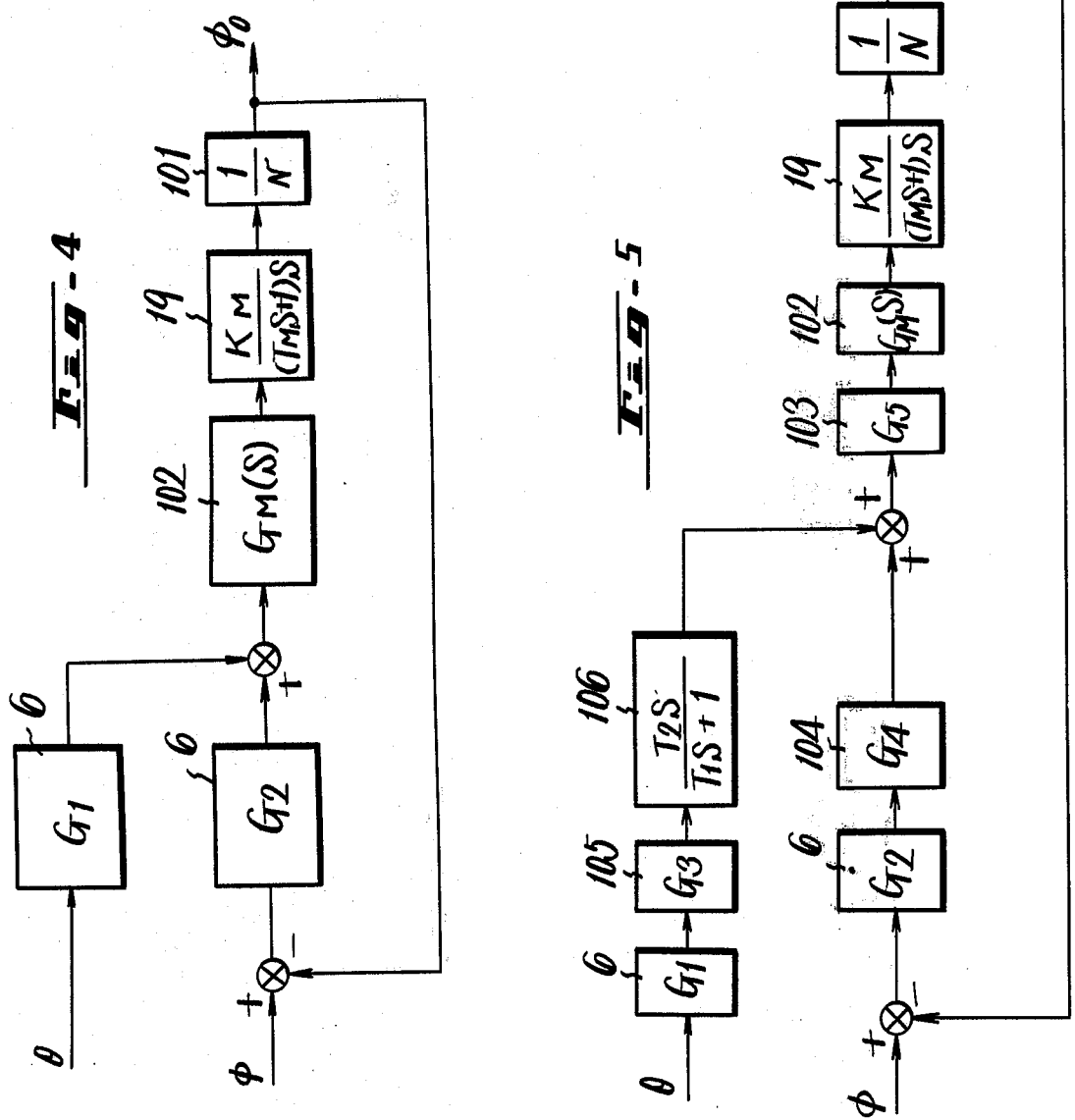

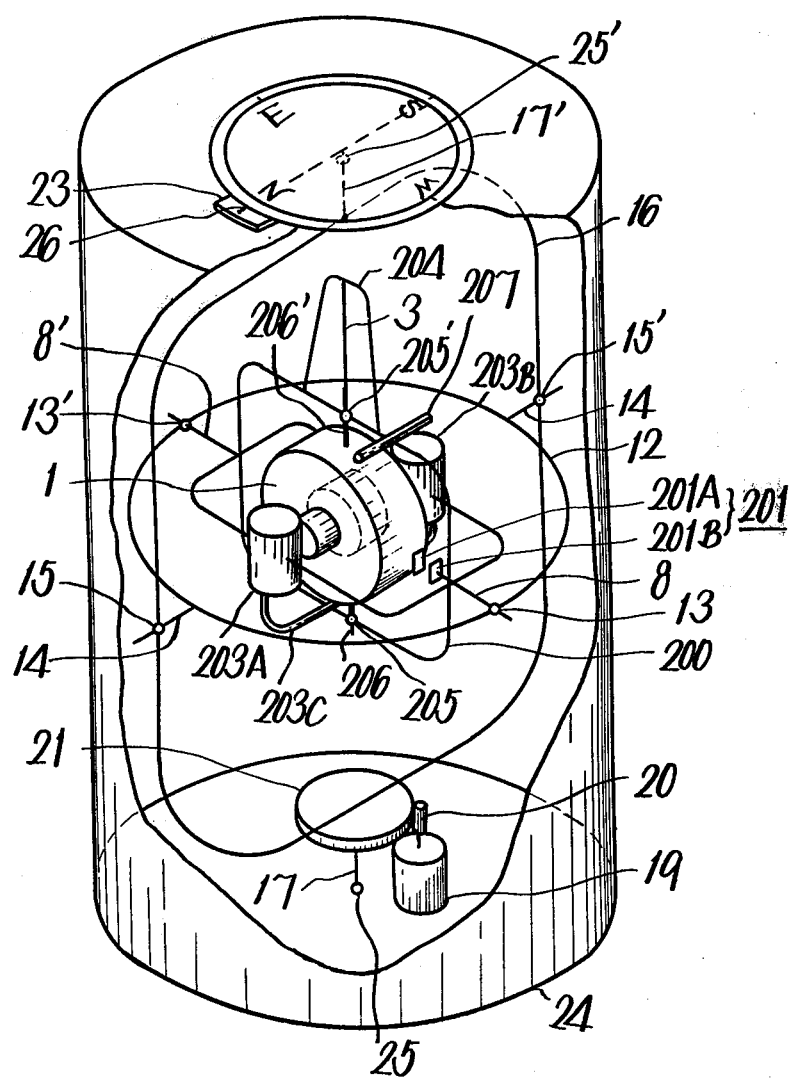

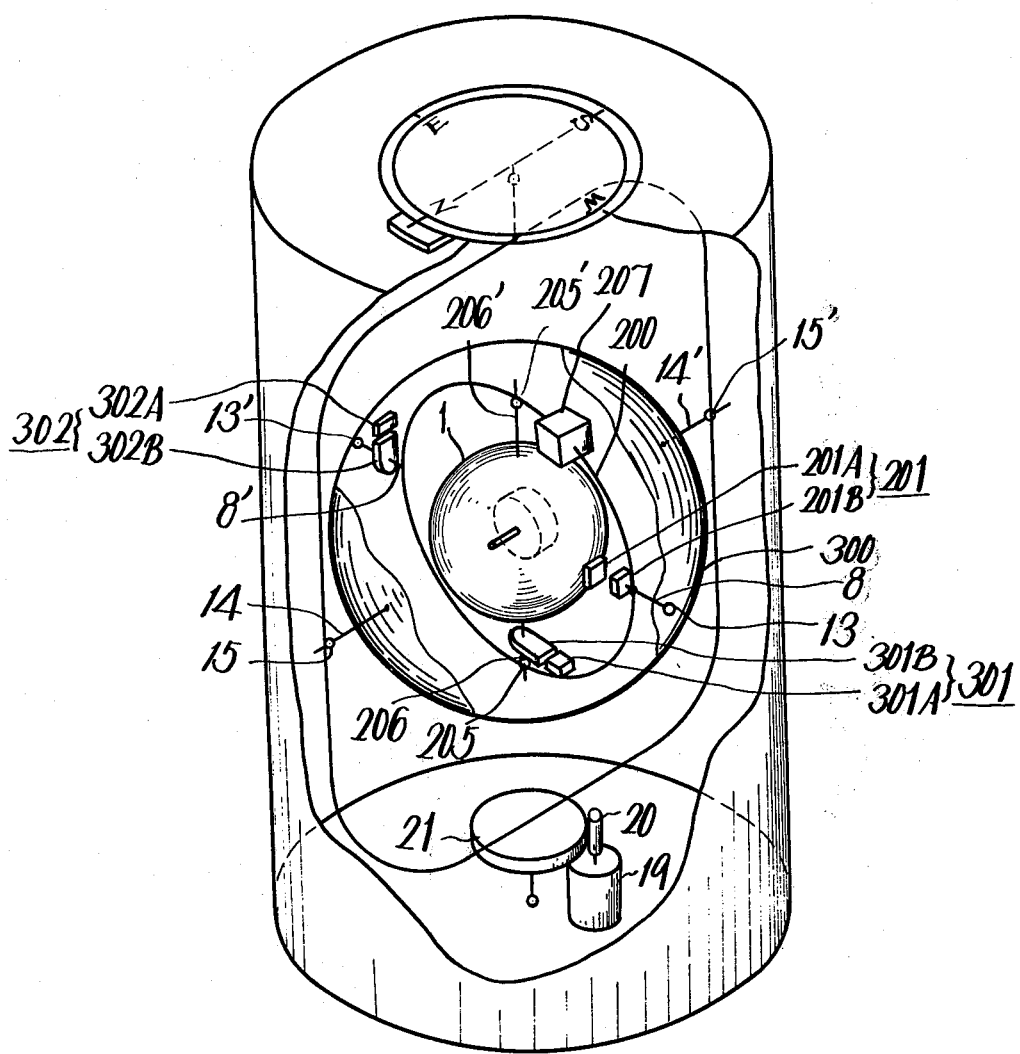

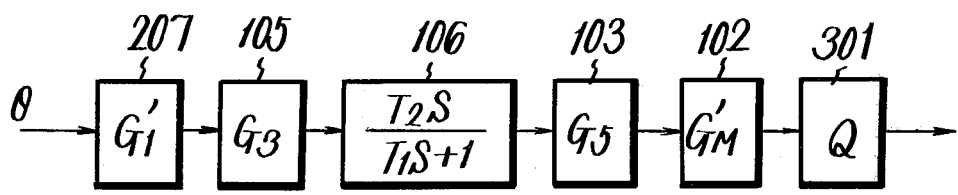
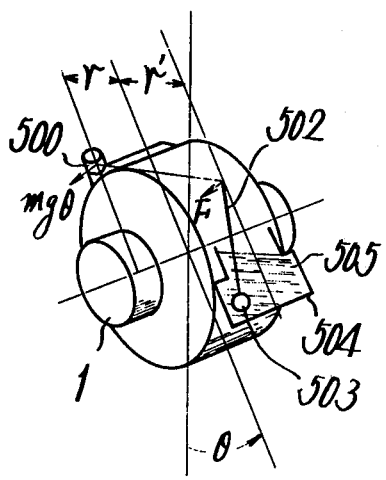
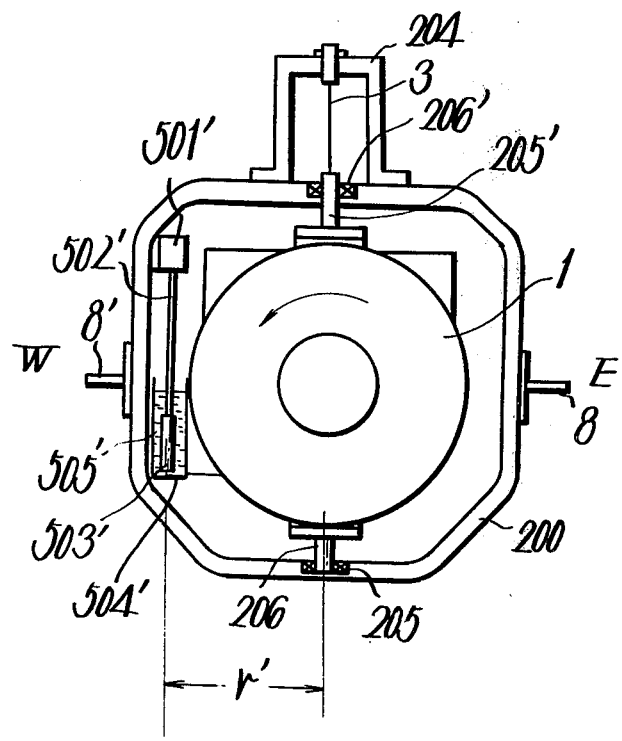

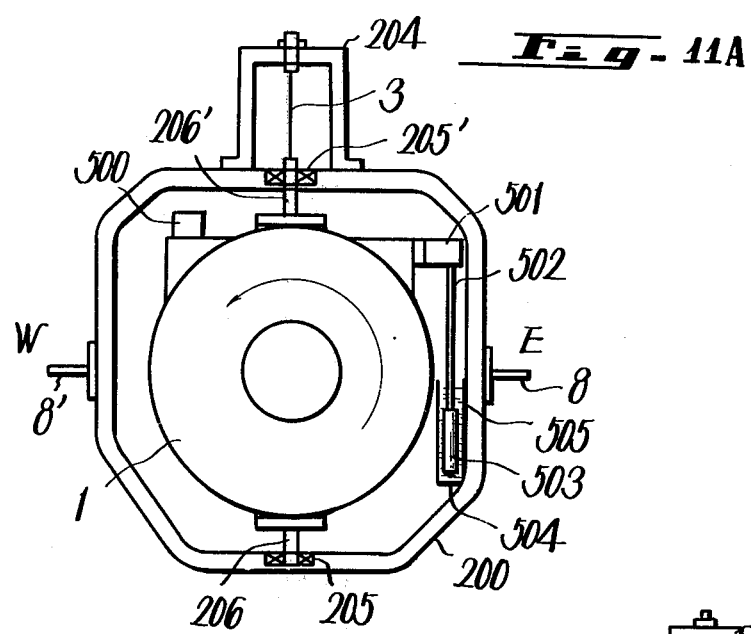
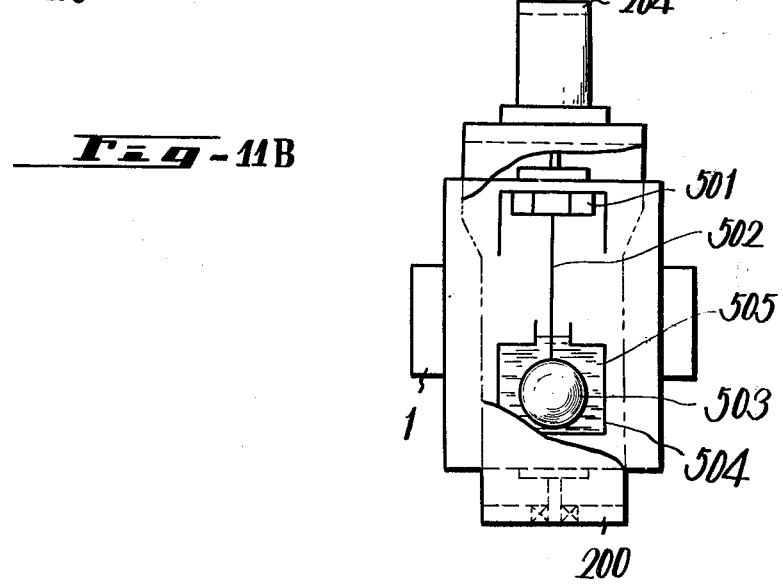

GYROCOMPASS

BACKGROUND OF THE INVENTION

1. Field of the Invention

This invention relates generally to a gyrocompass, and more particularly to a gyrocompass which is provided with means for damping the north-seeking action of a gyro spin axis.

2. Description of the Prior Art

For damping the north-seeking action of a gyro spin axis, known Anshuetz and Plath gyrocompasses are provided with a damping device, commonly referred to as a damping bottle, in a gyro case enclosing a gyro therein. No description will be given of the principle of this conventional damping device but it was already known about in 1910 and a similar method was employed in a prior Brown gyrocompass. The feature of this method is that torque produced by the damping bottle for damping the north-seeking action of the gyro spin axis is applied about a horizontal axis of the gyro (hence, this system will hereinafter be referred to as a horizontal axis damping system) and that the torque is advanced in phase as compared with the tilt of the gyro spin axis relative to a horizontal plane. The compass employing the damping bottle has an advantage that no latitude error is caused when settling relative to the earth pointing to the north but has a disadvantage that the inclination of the gyro spin axis to the horizontal plane is large and flowing of a liquid contained in the damping bottle requires much time, and hence the settling time is relatively long (about 5 hours).

Further, warships usually adopt a method of cutting out the damping device to avoid an acceleration error in the case of turning but, in this case, it is necessary to stop flowing of the liquid in the damping bottle. To this end, the conventional damping bottle method employs an electromagnetic value in the gyro case, and hence is inevitably expensive and complicated in construction.

While, Sperry gyrocompasses employ a known easterly eccentric axis or damping weight as the damping device for the north-seeking action of the gyro spin axis. Each of these systems is of the type that the torque for damping is applied about a vertical axis of the gyro (and hence it will hereinafter be referred to as a vertical axis damping system). With this prior system, the torque is proportional to the inclination angle of the gyro spin axis from the horizontal plane and the inclination of the gyro at the settling time is far smaller than that in the damping bottle system and no liquid is contained in the damping device, so that the settling time is relatively short (3 to 3.5 hours). However, this system has defects such as a latitude error, a fixed error resulting from a north-south mass unbalance torque of the gyro about its horizontal axis, an error in temperature dependency due to a change in the north-south mass unbalance caused by a temperature change and so on. Further, this system has a drawback such that the gyro spin axis causes a drift in the case of cutting out the damping device.

With the use of a known integrator in combination with a damping weight, the spin axis is held horizontal at the time of settling, and the latitude error and the fixed error resulting from the north-south mass unbalance of the gyro can be avoided. However, since there are the possibility that motion of large time constant still remains according to initial conditions of the integrator, the settling time is surely shorter than that of the damping bottle system but longer than that of the usual vertical axis damping system.

SUMMARY OF THE INVENTION

Accordingly, an object of this invention is to provide a gyrocompass employing a damping system which is free from the aforementioned defects experienced in the prior art damping systems.

Another object of this invention is to provide a gyrocompass employing a damping system which has the advantage of the vertical axis damping system that the settling time is relatively short but which avoids the latitude error, the fixed error resulting from the north-south mass unbalance of the gyro and the fixed error dependent upon temperature which are unavoidable in the conventional vertical axis damping system.

Another object of this invention is to provide a gyrocompass employing a vertical axis damping system which is capable of attaining the second-mentioned objects.

Still another object of this invention is to provide a gyrocompass employing a damping system with which it is possible to cut out the damping at the turning of a ship only by make and break of one electrical contact and which neither causes any drift nor requires any other special means such as an electromagnetic valve or the like.

BRIEF DESCRIPTION OF THE DRAWINGS

FIG. 2 is a schematic diagram illustrating one example of a gyrocompass to which this invention is applied;

FIG. 3 is a schematic diagram for explaining its operation;

FIG. 4 is a block diagram for explaining a damping system used in the gyrocompass of FIG. 2;

FIG. 5 is a block diagram showing this invention for the gyrocompasses depicted in FIGS. 2 and 7;

FIGS. 7 and 8 are respectively schematic diagrams illustrating other examples of the gyrocompass to which this invention is applicable;

FIG. 9 is a block diagram for explaining the operation of the gyrocompass of FIG. 8 when this invention is applied thereto;

FIGS. 11A and 11B are schematic diagrams showing other examples of this invention;

FIGS. 12 and 13 are schematic diagrams, for explaining the operation of the example of FIG. 11; and FIG. 14 is a schematic diagram illustrating another example of this invention.

DESCRIPTION OF THE PREFERRED EMBODIMENTS

To facilitate a better understanding of this invention, a description will be given first of the conventional vertical axis damping system. In the gyrocompass, it is necessary that torque $K\theta$ proportional to the inclination angle $\theta$ of its gyro spin axis to the horizontal plane, K being a proportional constant, is applied about a horizontal axis perpendicular to the gyro spin axis, thereby to cause the north-seeking action of the gyro.

A device for producing the torque $K\theta$ will hereinafter be referred to as a north-seeking device. Only with the use of the north-seeking device, the gyro spin axis oscillates sinusoidally to the east and west about the north and does not rest toward the north. At the same time, the tilt of the gyro spin axis also sinusoidally oscillates in synchronism therewith and the center of the oscillation is not horizontal but, in the northern hemisphere, it is at a position where the northern end of the spin axis is a little raised. The center of the oscillatory movement of the tilt of the gyro spin axis is at the following angle to the horizontal plane:

$$\frac{H}{K}\Omega\sin\phi$$

where $H$ is the angular momentum of the gyro, $\Omega$ the angular velocity of the rotation of earth and $\phi$ the latitude of the place where the gyrocompass is located.

While, assuming that the gyro is not completely balanced about the aforementioned horizontal axis but is heavier on the southern side, that the gyro rotates clockwise when viewed from the south and that the torque produced about the horizontal axis due to this unbalance and gravity is $My$, the center of the oscillation of the tilt of the gyro spin axis has a value larger than the above one by $My/K$.

Figure 1:
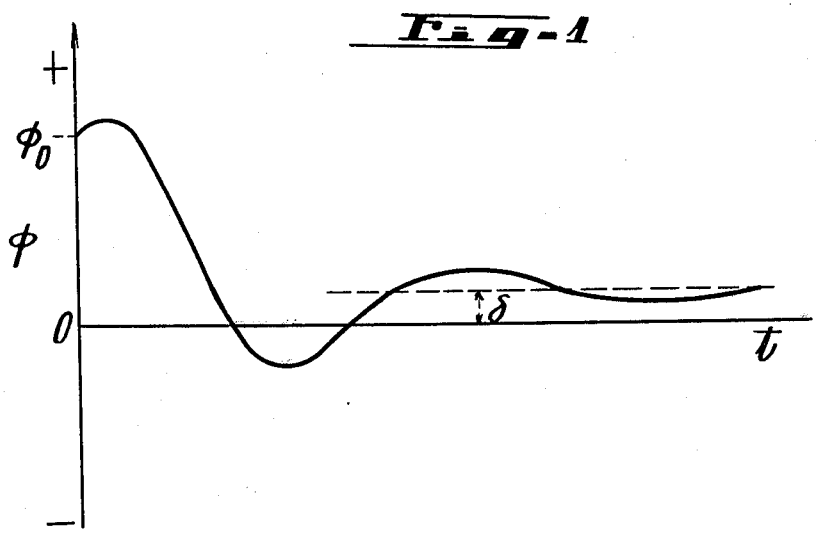
FIG. 1 is a schematic diagram showing the north-seeking action of a conventional gyrocompass.

The vertical axis damping system is a system that the oscillatory movement of the spin axis is damped by applying some torque about a vertical axis perpendicular to the spin axis and the horizontal axis, and, in the prior art, torque proportional to the inclination angle $\theta$ is used for the purpose. If a proportional constant is taken as $\mu$, the torque applied about the vertical axis is $\mu\theta$, by which the motion of the gyro spin axis is damped and the spin axis sets still pointing substantially to the north as is well-known in the art. By way of example, FIG. 1 shows the case where the azimuth of the gyro spin axis is $\phi_0$ at a time $t = 0$ and the inclination angle $\theta$ of the spin axis is zero and the spin axis is a little lowered on the northern side. With the lapse of time $t$, the azimuth $\phi$ of the spin axis performs dapmed oscillation and settles at a constant angle $\delta$. The inclination angle $\theta_a$ of the spin axis when settling has a value of the center of the oscillation when $\mu=0$ (where the vertical axis damping system is not employed), that is, the inclination angle is determined by the following equation:

$$\theta_a = \frac{H}{K}\Omega\sin + \frac{My}{K}$$

where $My$ is the north-south mass unbalance of the gyro.

It must be noted here that since the inclination angle $\theta$ the spin axis is not zero even when the gyro sets still, the torque $T_a$ about the vertical axis for damping is determined by the following equation corresponding to the inclination angle $\theta$:

$$T_a = \mu\ (\frac{H}{K}\Omega\sin\phi + \frac{My}{K})$$

where it is noted that the value is not zero.

Generally, in the gyrocompass, upward torque $M_z$ about the vertical axis and an azimuth error $\Delta\phi$ while settling of the gyro bear the following relation:

$$\Delta\phi = \frac{M_z}{H\Omega\cos\phi} \qquad (1)$$

The settling value $\delta$ of the azimuth can be obtained from the equation (1) as follows:

$$\delta = \frac{M_z}{H\Omega\cos\phi} = \frac{\mu\ (\frac{H}{K}\Omega\sin\phi + \frac{My}{K})}{H\Omega\cos\phi}$$

$$= \frac{\mu}{K}\tan\phi + \frac{\mu}{K}\frac{My}{H\Omega\cos\phi} \qquad (2)$$

In the above case, the settling value $\delta$ of the azimuth is produced toward east. The first term of the equation (2) is proportional to the tangent of the latitude, and hence called latitude error. Further, the second term of the equation (2) is proportional to the north-south mass unbalance $My$ of the gyro, that is, it is a fixed error caused in response to the north-south mass unbalance of the gyro. It will be understood from the foregoing that the cause for the fixed errors is that the torque for damping still remains as fixed torque about the vertical axis when the gyro sets still.

A damping system of this invention is applicable to various types of gyrocompasses. The following will describe first a gyrocompass proposed by the present applicant and then one example of this invention as being applied to the gyrocompass. FIG. 2 shows the construction of the gyrocompass. In the figure, reference numeral 1 indicates a gyro case which includes therein a gyro rotor rotating at high speed and which is made liquid tight. Reference numeral 2 designates a container such as a tank, which surrounds the gyro case 1, and 3 a suspension wire for supporting the gyro case 1, which is fixed at its upper and lower ends to the tank 2 and the gyro case 1 respectively. References 4N, 4S and 5N, 5S identify primary and secondary side elements of a contactless displacement detector 6 respectively. The primary side elements 4N and 4S are mounted, for example, on the surface of the gyro case 1 at the intersecting points with the extension of the gyro spin axis, that is, on the north and south sides of the gyro rotor, respectively. While, the secondary side elements 5N and 5S are located on the tank 2 at positions corresponding to the primary side elements 4N and 4S. Reference numeral 7 represents a liquid such as a damping oil of high viscosity, which is contained in the tank 2. A pair of horizontal shafts 8 and 8' are secured at their one ends to the equator of the tank 2 at positions perpendicular to the spin axis (on the east and west sides of the gyro) and the other ends of the horizontal shafts 8 and 8' are rotatably fitted in bearings 13 and 13' provided on a horizontal ring 12 at places corresponding to the shafts 8 and 8' respectively. Reference numeral 10 designates a servo motor for horizontal follow-up purpose, which is coupled with the horizontal ring 12. A horizontal gear 9 is mounted on the one horizontal shaft 8 and meshed with a horizontal pinion 11 affixed to the rotary shaft of the servo motor 10. Gimbal shafts 14 and 14' are respectively attached to the horizontal ring 12 at positions perpendicular to the horizontal shaft bearings 13 and 13' and they are rotatably fitted in gimbal shaft bearings 15 and 15' provided on a follower ring 16 at those positions corresponding to them respectively. The follower ring 16 has attached thereto upwardly and downwardly thereof follower shafts 17 and 17', the free ends of which are rotatably fitted in follower shaft bearings 25 and 25' mounted on a binnacle 24 at positions corresponding to the follower shafts 17 and 17'. An azimuth gear 21 is attached to the one follower shaft 17. Reference numeral 19 indicates an azimuth follower servo motor mounted in the binnacle 24 and 20 an azimuth pinion affixed to the rotary shaft of the servo motor 19, which pinion is meshed with the azimuth gear 21. Reference numeral 22 represents a compass card, which is mounted on the other follower shaft 17'. Reference numeral 23 identifies a reference line plate mounted on the top of the binnacle 24 in opposing relation to the compass card 22. The course of a vehicle on which the gyrocompass is mounted is read out from a reference line 26 drawn on the reference line plate 23 centrally thereof and the compass card 22.

The contactless deviation displacement detector 6 will be now briefly described. AC fluxes originated from the primary side elements 4N and 4S are detected by the secondary side elements 5N and 5S, thereby simultaneously detecting relative deviation angles of the gyro case 1 to the tank 2 about the vertical axis (concretely, about the suspension wire 3) and about the horizontal shafts 8 and 8'. An electrical signal proportional to the relative deviation angle of the gyro case 1 to the tank 2 about the vertical axis (which signal will be hereinafter referred to as a vertical follow-up signal) is amplified by a vertical follow-up servo amplifier 102 (refer to FIG. 4) to control the servo motor 19. The rotation of the servo motor 19 is transmitted to the tank 2 through the pinion 20, the azimuth gear 21, the follow-up ring 16, the shafts 14 and 14', the horizontal ring 12 and the shafts 8 and 8', by which the tank 2 is turned about the vertical axis of the gyro case 1 to reduce the relative deviation of the tank 2 to the gyro case 1 to zero at all times. In a similar manner, an electrical signal (which signal will be hereinafter referred to as a horizontal follow-up signal) corresponding to the relative deviation angle of the gyro case 1 to the tank 2 about the horizontal shafts 8 and 8' is fed from the contactless displacement detector 6 to a horizontal follow-up servo amplifier described later and is thereby amplified, thereafter being applied to the servo motor 10 to control it. The rotation of the servo motor 10 is transmitted to the tank 2 through the pinion 11, the gear 9 and the shaft 8, by which the tank 2 is caused to follow the gyro case 1 about the shafts 8 and 8'.

FIG. 3 is a schematic diagram, for explaining the motion of the gyro case 1 in the direction of the spin axis relative to the tank 2 while the follow-up servo systems are in operation as described above. The figure shows the case where the direction AB of the gyro spin axis in the gyro case 1 is tilted at angle $\theta$ from a horizontal plane HH'. The secondary side elements 5N and 5S of the contactless displacement detector 6 lie at positions A' and B' on the tank 2 and the horizontal follow-up servo system is in operation, so that the positions A' and B' are on the extension of the straight line AB. While, since gravitational acceleration acts on the gyro case 1, the suspension wire 3 connected between a point P on the top of the tank 2 and gyro case 1 becomes substantially parallel with the line of gravity, and accordingly the distance between B and B' is shorter than that between A and A'. Namely, the difference in distance between A–A' and B–B' is in proportion to the angle $\theta$.

The contactless displacement detector 6 also produces an AC electrical signal corresponding to the difference in distance between A–A' and B–B' by the subtraction of signals derived from the secondary side elements 5N and 5S. This electrical signal is in proportion to the angle $\theta$, and hence will hereinafter be referred to as a $\theta$ signal. If the angle $\theta$ is negative and the point A' lies below the line HH', the distance between the points A and A' is shorter than that between the points B and B' and the $\theta$ signal is also reversed in phase. Needless to say, if the angle $\theta$ is zero, the distances between the points A and A' and between those B and B' are equal to each other and the $\theta$ signal is zero.

The damping system for use with the gyrocompass of FIG. 2 described above is a system that the $\theta$ signal is added to the vertical follow-up signal in the vertical follow-up servo amplifier. With this system, the tank 2 is displaced by the vertical follow-up servo system about the vertical axis until the contactless displacement detector 6 produces a vertical follow-up signal which is exactly equal in magnitude to the $\theta$ signal added and opposite in polarity thereto, because the servo motor 19 does not stop until the sum of the vertical follow-up signal and the $\theta$ signal becomes zero. Therefore, the value of the vertical follow-up signal is always proportional to the $\theta$ signal and hence to the inclination angle $\theta$. Thus, the suspension wire 3 is always twisted by the vertical servo system in proportion to the inclination angle $\theta$. If the proportional constant between torque produced by the twisting of the suspension wire 3 and the inclination angle $\theta$ is taken as $\mu$, the gyro case 1 is supplied with torque $\mu\theta$ about the vertical axis, so that the north-seeking action of the gyro spin axis can be damped as described previously with regard to the aforesaid vertical axis damping system. If the spin axis of the gyrocompass is deviated from the north at an angle of $\phi_0$ thereto toward the east with the northern end a little lowered, the spin axis performs exactly the same motion as that described previously in connection with FIG. 1 and it finally sets still holding the fixed error $\delta$.

In FIG. 4 there is illustrated in block form the relationship between the vertical follow-up servo system and the $\theta$ signal in the gyrocompass shown in FIG. 2.

In FIG. 4, $\phi$ indicates the azimuth of the gyro spin axis (the direction of the straight line AB in FIG. 3) and $\phi_0$ indicates the azimuth of the line A'B' of the tank 2. The difference ($\phi-\phi_0$) between them is converted by the contactless displacement detector 6 (having a gain $G_2$) into a corresponding vertical follow-up signal, which is added with the $\theta$ signal which is also an output from the contactless displacement detector 6 of a gain $G_1$. The resulting signal is applied to the servo motor 19 through the servo amplifier 102 and the output angle derived therefrom is applied through a gear train 101 (corresponding to the gear ratio 1/N of the gear 17 to the pinion 20) to the tank 2 to provide its azimuth $\phi_0$.

FIG. 5 illustrates an example of this invention as being applied to the gyrocompass of FIG. 2. In FIG. 5, the same elements as those in FIG. 4 are identified by the same reference numerals and no description thereof will be repeated. The difference between the azimuths $\phi$ and $\phi_0$ is converted by the contactless displacement detector 6 into an AC electrical signal as in the case of FIG. 4 but, in the example of FIG. 5, the AC signal is converted by an AC-DC converter 104 into a DC signal and then converted again by an electric circuit 103 into an AC signal. The circuit 103 is formed with a circuit including an adder, a circuit accessory thereto and a DC-AC converter. While, the θ signal is converted by the detector 6 into an AC signal and then converted into a DC signal by an AC-DC converter 105 similar to the aforementioned one 104, thereafter being applied to an operational amplifier 106. The output from the operational amplifier 106 is added to the vertical follow-up signal in the circuit 103. The characteristic of the operational amplifier 106 plays the most important role in the present invention. Assume that the transfer function of the operational amplifier 106 contains at least the following characteristic as depicted in FIG. 5:

$$\frac{T_2 S}{T_1 S + 1}$$

where $S$ is the Laplace operator. As is well-known in the automatic control engineering, if the inclination angle θ varies sinusoidally, the output signal derived from the operational amplifier 106 at that time can be expressed in such a form that S is replaced with $j_\omega$. Here, $j^2 = -1$. Namely, the output signal mentioned above can be expressed as follows:

$$\frac{j\omega \, T_2}{j\omega \, T_1 + 1}$$

Even where ω is selected to be an angular frequency corresponding to a usual period of the gyrocompass, that is, about 70 to 100 minutes, if $T_1$ is selected to well hold $\omega T_1 > 1$, the aforementioned output signal approaches the signal given by the following equation (3):

$$\frac{j\omega \, T_2}{j\omega \, T_1 + 1} \approx \frac{j\omega \, T_2}{j\omega \, T_1} = \frac{T_2}{T_1} = \text{a constant} \quad (3)$$

It has been described previously that the angle θ varies sinusoidally while the gyro moves to point to the north. Accordingly, the θ signal varies on the cycle of the north-seeking action during such a north-seeking action of the gyro, so that the output signal from the operational amplifier 106 is almost composed of the θ signal because the transfer function of the operational amplifier 106 is substantially close to 1. The vertical servo system, which is supplied with the output from the operational amplifier 106, shown in FIG. 5 is substantially same as that shown in FIG. 4 at this motion. Consequently, also with the use of the vertical follow-up servo system of FIG. 5, the torque generated by the twist of the suspension wire 3 is substantially μθ as in the case of FIG. 4, with which it is possible to cause the gyrocompass of FIG. 2 to perform satisfactory damped oscillation in the north-seeking action. Further, this property is the same as that obtainable with the conventional vertical axis damping system, and hence provides an advantage that the settling time is far shorter than that in the horizontal axis damping system.

Figure 6:
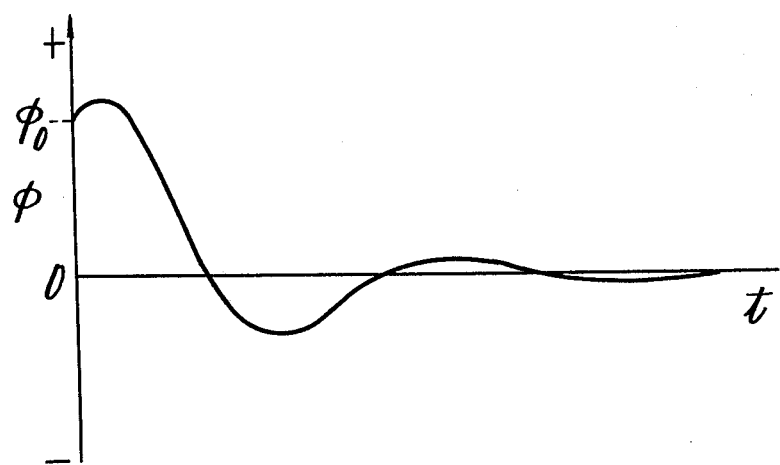
FIG. 6 is a schematic diagram showing the north-seeking action of the gyrocompass embodying this invention.

While, when the gyro gradually settles, the θ signal approaches a constant value $H\Omega \sin \phi/K$ as described previously. However, since the characteristic of the operational amplifier 106 is apparently "a differential characteristic of first order lag", the differentiation of a constant value is zero and hence this basic characteristic remains unchanged even if provided with the first order lag. Therefore, as the θ signal approaches the constant value, the output from the operational amplifier 106 gradually approaches zero. When the gyro has thus settled, the output from the operational amplifier 106 reaches completely zero. As a result, in the vertical follow-up servo system the suspension wire 3 is not twisted any when the gyro rests, so that no torque is applied about the vertical axis of the gyro and hence $M_z = 0$. Accordingly, the settling value δ of the azimuth is also zero, no latitude error is present and the fixed error due to the north-south mass unbalance M$y$ of the gyro is not caused. Thus, the object of this invention is attained to provide a vertical axis damping system with the settling time of the gyro being relatively short and which is free from the fixed errors. The north-seeking characteristic of the gyrocompass employing the system of FIG. 5 is such as depicted in FIG. 6 and it is different from the characteristic of FIG. 1 in that the settling value δ of the azimuth is not provided.

In FIG. 5, the output from the operational amplifier 106 is added in the form of the DC signal to the vertical follow-up signal at the beginning stage of the circuit 103 but it is also possible to convert the output from the operational amplifier 106 into an AC signal immediately, hold the vertical follow-up signal in the form of the AC signal without applying it to the AC-DC converter 104, add the both AC signals together and immediately apply the resulting signal to the vertical servo amplifier 102. In short, it is sufficient for the purpose that the θ signal can be supplied with the characteristic $T_2S/(T_1S+1)$. Various methods can be effected with circuit design techniques and it will be seen that they fall within the scope of this invention.

The present invention is similarly applicable to other types of gyrocompasses and examples of the invention will hereinbelow be described as being applied to two kinds of gyrocompasses.

FIG. 7 is a diagram, for explaining the application of this invention to a gyrocompass provided by the same applicant of the present application. In the figure, reference numerals employed correspond to those in FIG. 2.

The gyrocompass of FIG. 7 is identical in construction with that of FIG. 2 in connection with the horizontal ring 12, the shafts 14 and 14', the bearings 15 and 15', the follower ring 16, the shafts 17 and 17', the bearings 25 and 25', the servo motor 19, the pinion 20 and the azimuth gear 21. The gyrocompass of FIG. 7 is different from that of FIG. 2 in that no horizontal follow-up servo system is employed and that the shafts 8 and 8' are rotatably supported by thee bearings 13 and 13'. The shafts 8 and 8' are coupled to a vertical ring 200 which has a base 204 and bearings 205 and 205'. The gyro case 1 having housed therein the gyro has vertical shafts 206 and 206' upwardly and downwardly thereof and the vertical shafts 206 and 206' are rotatably supported by the aforementioned bearings 205 and 205' respectively and the upper end of the shaft 206' is suspended by the suspension wire 3 from the base 204 of the vertical ring 200 centrally thereof. The gyrocompass employs as a north-seeking device a liquid ballistic which is fixed to the vertical ring 200 and which comprises two pots 203A and 203B, a communication pipe 203C intercommunicating the pots 203A and 203B and a liquid half-filling the pots 203A and 203B and flowing therebetween through the pipe 203C. In the example of FIG. 7, an accelerometer or an electrolytic level 207 is mounted on the vertical ring 200 or detecting the inclination angle $\theta$ of the spin axis to a horizontal plane. Shown in block form, the example of this invention in FIG. 7 is similar to that of FIG. 5 except that the $\theta$ signal is an AC signal derived from the aforesaid electrolytic level 207 and that the detection of the difference in azimuth ($\phi - \phi_0$) is achieved by a contactless azimuth deviation angle detector 201 (having its elements 201A and 201B mounted on the gyro case 1 and the vertical ring 200 respectively). Namely, the application of the system of FIG. 5 to the compass of FIG. 7 enables realization of the vertical axis damping that the settling value $\delta$ of the azimuth is reduced to zero as described previously with regard to FIG. 6.

FIG. 8 illustrates another example of the gyrocompass embodying the present invention. In the present example, the shafts 14 and 14' and the parts on the outside of them are identical with those in FIGS. 2 and 7. In the illustrated example, the horizontal ring 12 employed in the foregoing examples is not used but instead a vessel 300 such as, for example, a spherical shell is provided which is partially cut away in FIG. 8 and the bearings 13 and 13' are provided inside of the vessel 300 and they rotatably support the horizontal shafts 8 and 8'. Further, the vertical ring 200 carries the bearings 205 and 205' and is substantially identical with that employed in FIG. 7 and has the shafts 8 and 8' but does not carry the base 204. The gyro case 1 having incorporated therein the gyro has the vertical shafts 206 and 206' which are supported by the bearings 205 and 205'. The contactless azimuth deviation angle detector 201 is also identical in construction with that used in FIG. 7 and the accelerometer 207 is fixedly mounted on the vertical ring 200 and used for detecting the inclination angle $\theta$ as is the case with the example of FIG. 7. The example of FIG. 8 is different from that of FIG. 7 firstly in that since the gyro case 1 is not suspended by the suspension wire 3 employed in the example of FIG. 7 but substantially spherical and floated by a liquid (not shown) contained in the vessel 300, the specific gravity of the gyro case 1 being selected substantially equal to that of the liquid in the vessel 300, secondary in that the north-seeking device is a torquer 302 for converting an electrical signal into corresponding torque; and thirdly in that a damping torquer 301 is provided. The torquer 302 has its one element 302A fixed to the vessel 300 and the other element 302B fixed to the shaft 8' and it is adapted to generate torque about the shaft 8' in proportion to an electrical signal fed to the element 302A. By supplying the torquer 302 with an electrical signal proportional to the inclination angle $\theta$ detected by the accelerometer 207 after amplifying it, torque $K\theta$ for the north-seeking action is provided. Likewise, the torquer 301 has elements 301A and 301B fixed to the vertical ring 200 and the shaft 206 respectively and is adapted to apply torque to the gyro about the shafts 206 and 206' by applying an electrical signal to the element 301A. Supplying the torquer 301 with an electrical signal proportional to the inclination angle $\theta$ detected by the accelerometer 207 after amplifying it, the conventional vertical axis damping system is provided. However, if the present invention is applied to the gyrocompass depicted in FIG. 8, its vertical axis damping system can be illustrated as a block diagram in FIG. 9. Namely, if the signal derived from the accelerometer 207 is an AC signal, it is converted by the AC-DC converter 105 into a DC signal, applied to the operational amplifier 106 having at least the characteristic $T_2S/(T_1S+1)$ as in FIG. 5 and then applied through the DC-AC converter 103 to the servo amplifier 102 to be thereby amplified and the amplified signal is fed to the torquer 301. In this case, damping torque is directly applied by the torquer 301 to the gyro about the vertical axis and this is still the vertical axis damping system and damping for reducing the settling value $\delta$ of the azimuth to zero can be obtained to attain the purpose.

In FIG. 9, if the output from the accelerometer 207 is a DC one and the torquer 301 is a DC torquer, the AC-DC and DC-AC converters 105 and 103 can be left out.

Now, the difference between the conventional vertical axis damping system and this invention system will be explained more clearly in a different way. If the torque about the vertical axis for damping is taken as $Q_D$, the torque $Q_D$ in the prior art system is expressed in the following form:

$$Q_D = \mu\theta \qquad (4)$$

While, the relationship between the torque $Q_D$ and the inclination angle $\theta$ in the damping system of this invention is given by the following equation (5):

$$\frac{d}{dt}Q_D + \frac{1}{T_1}Q_D = \mu \frac{d}{dt}\theta \qquad (5)$$

If $T_1$ is very large and a change in $\theta$ is great, the first term is sufficiently larger than the second term in the left side of the equation (5) and hence the equation (5) can be regarded as the following equation (6):

$$\frac{d}{dt}Q_D \approx \mu \frac{d}{dt}\theta \qquad (6)$$

Accordingly, $Q_D = \mu\theta$ and the damping action is provided and when the angle $\theta$ no more changes, $d/dt\,\theta = 0$, resulting in $Q_D = 0$ as will clearly be seen from the equation (6). By the Laplace transformation of the equation (6) of the relationship between $Q_D$ and $\theta$ with the Laplace operator being taken $S$, the Laplace transformation of $Q_D$ and $\theta$ being taken as $Q_D(S)$ and $\theta(S)$ respectively and the initial conditions being all zero, the following equation is obtained:

$$SQ_D(S) + \frac{1}{T_1}Q_D(S) = \mu S\theta(S)$$

Accordingly, the following equation (7) is immediately obtained therefrom:

$$\frac{Q_D(S)}{\theta(S)} = \frac{\mu S}{S + \frac{1}{T_1}} = \mu \cdot \frac{T_1 S}{T_1 S + 1} = \mu \frac{\alpha T_2 S}{T_1 S + 1} = (\mu\alpha)\frac{T_2 S}{T_1 S + 1} \qquad (7)$$

where $T_1/T_2$ is taken as $\alpha$.

In general, it is not required that the transfer function of the operational amplifier 106 has the same time constant $T_1$ in its denominator and numerator but it can be expressed as $T_2S/(T_1S + 1)$ as shown in block 106 in FIGS. 5 and 9. In this case, however, it is required to multiply the gain of, for example, AC-DC converter 105 by $\alpha$ in accordance with $T_2$. In other words, the value of $\mu$ can be selected by adjusting the gain $G_3$ of the AC-DC converter 105, so that if the AC-DC converter 105 includes an amplifying section, $T_2$ can be selected at will.

The value of the time constant $T_1$ is important in the present invention. Based on the fact that the period of the gyrocompass is usually 70 to 120 minutes, if $T_1$ is several hundred seconds, the north-seeking action is damped but the damping is insufficient in this case. Where $T_1$ is larger than 1,000 seconds, it is practicable and if it is about 2,000 seconds, satisfactory and ideal damping action can be obtained. The larger $T_1$ is, the better but the effect does not practically change with $T_1$ larger than about 2,000 seconds. According to our experiments on the example of this invention applied to the gyrocompass of FIG. 2, $T_1 = 2,000$ seconds, the north-seeking cycle was 80 minutes (in lat. 35° N.), the damping ratio of the amplitude to every half cycle was nearly equal to 0.30 and the latitude error, the fixed error due to the meridional unbalance and the fixed error due to temperature change were not ever resulted.

Figure 10A:
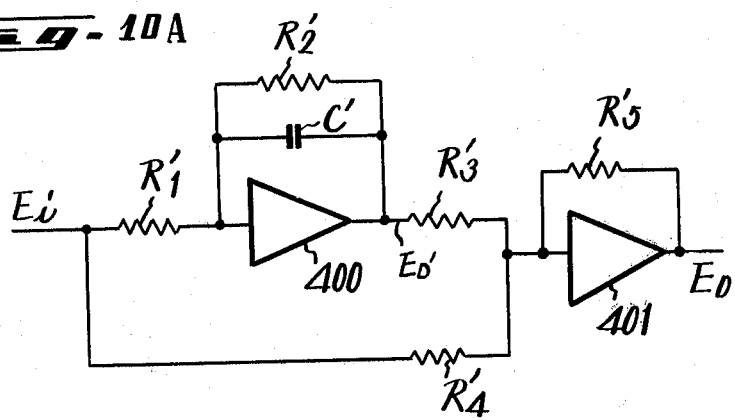
FIGS. 10A to 10C, inclusive, are connection diagrams of operational amplifiers for use in this invention.
Figure 10B:
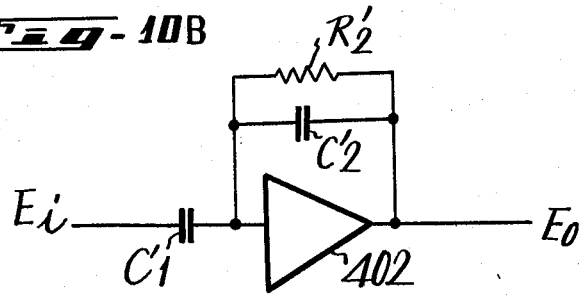

Next, a description will be made in connection with the manner in which the characteristic of the transfer function $T_1S/(T_1S+1)$ is concretely realized in the operational amplifier 106. Since this characteristic is a problem of the operational amplifier circuit, many methods can be adopted. Two of them are illustrated in FIGS. 10A and 10B. With the system of FIG. 10A, an output voltage $E'_0$ from an amplifier 400 and an input voltage $E_i$ bear the relation given by the following equation (8):

$$\frac{E'_0}{E_i} = \frac{-R_2}{R_1} \cdot \frac{1}{R_2CS + 1} \quad (8)$$

Therefore, the relation expressed by the following equation (9) holds between an output voltage $E_0$ from an amplifier 401 and the input voltage $E_i$:

$$E_0 = R_5 \frac{R_2}{R_1R_3} \cdot \frac{1}{R_2CS + 1} - \frac{1}{R_4}E_i \quad (9)$$

Accordingly, if the resistance values $R_1$, $R_2$, $R_3$, $R_4$ and $R_5$ of respective resistors $R'_1$, $R'_2$, $R'_3$, $R'_4$ and $R'_5$ are selected so as to satisfy $R_1R_3/R_2 = R_4 = R_5$, the following equation (10) is obtained:

$$E_0 = (R_5 \frac{1}{R_5} \cdot \frac{1}{R_2CS + 1} - \frac{1}{R_5}) E_i$$

$$= - (1 - \frac{1}{R_2 + 1}) E_i = \frac{-R_2CS}{R_2CS + 1}E_i \quad (10)$$

Thus, the desired operation is achieved. At this time, $T_1 = T_2 = R_2C$, where $C$ is the capacitance of a capacitor $C'$.

In FIG. 10B, the relationship between the output $E_0$ and the input $E_i$ of an amplifier 402 is as given by the following equation (11):

$$E_0 = -\frac{R_2C_1S}{R_2C_2S + 1} \quad (11)$$

Accordingly, the purpose can also be attained with the circuit of FIG. 10B where $T_1 = R_2C_2$ and $T_2 = R_2C_1$ and $C_1$ and $C_2$ are the capacitances of capacitors $C'_1$ and $C'_2$.

Figure 10C:
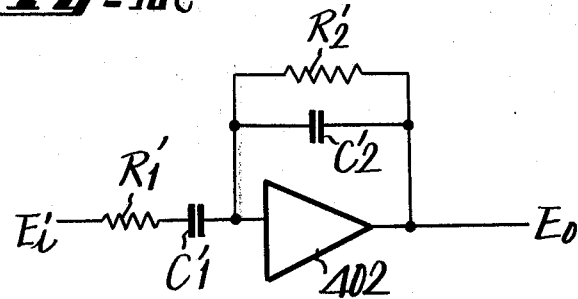

FIG. 10C shows an example in which one first order lag is added. The relationship between the output $E_0$ and the input $E_i$ in this example is expressed by the following equation (12):

$$E_0 = \frac{R_2C_1S}{(R_1C_1S + 1)(R_2C_2S + )} \quad (12)$$

Therefore, it is possible to perform an operation similar to that in the example of FIG. 10B with $C_1 = C_2$ and $T_1 = R_2C_2$. If the condition $R_1 << R_2$ is satisfied and a time constant $R_1C_1$ is selected to be smaller than several minutes, the time constant is too small as compared with the period (70 to 100 minutes) of the north-seeking action of the gyro, so that high frequency noises in the $\theta$ signal resulting from the oscillation or the like of a ship can be removed without exerting any influence on the north-seeking action and on the damping action based on $T_1 > 1000$. Thus, the system of FIG. 10C is more advantageous in practice.

As described previously, the characteristic of the term $T_2S/(T_1S + 1)$ can be obtained with many other circuits and the method of adding the high cut (low-pass) filter is also many and they can also be employed in the practice of this invention.

Further, the damping cutout at the time of turning of a warship can be effected only by opening a switch which may be inserted in series in the loop of the $\theta$ signal, for example, at a stage preceding the operational amplifier 106 in FIGS. 5 and 9. Since no fixed error is present, the gyro settling point is always the same independently of the presence of the damping action, and accordingly no drift is produced at the time of damping cutout.

The foregoing description has been given in connection with the method in which the inclination angle of the gyro spin axis to a horizontal plane is once converted into an electrical signal; the signal is applied to an appropriate circuit to obtain a signal corresponding to time differentiation of first order lag; and the signal is applied as torque to the gyro about its vertical axis by means of the torquer or by twisting the suspension wire. However, this invention is not limited specifically to the above electrical method and can also be practised by a purely mechanical method. This will hereinbelow be described in detail.

FIGS. 11A and 11B illustrate a modified form of this invention in which the mechanical method is applied to the gyrocompass of FIG. 7 which is of the type employing the liquid ballistic as a north-seeking device. FIGS. 11A and 11B are a diagram of the gyrocompass viewed from the south side, with the parts inside of the vertical ring 200 shown on an enlarged scale, and a side view, respectively. The parts corresponding to those in the foregoing are marked with the same reference numerals and no description thereof will be repeated. FIG. 11A is a side view from the south side of the gyro and the gyro rotor rotates anticlockwise as depicted in the figure. A damping weight 500, which is similar to that employed in the ordinary vertical axis damping system, is mounted on the west side of the gyro case 1 and a mount 501 having fixed thereto the upper end of a suspension band 502 is disposed on the east side of the gyro case 1. The lower end of the suspension band 502 has fixed thereto a weight 503, which is immersed in a damping liquid 505 of high viscosity contained in a vessel 504 fixedly mounted on the vertical ring 200.

Figure 12:
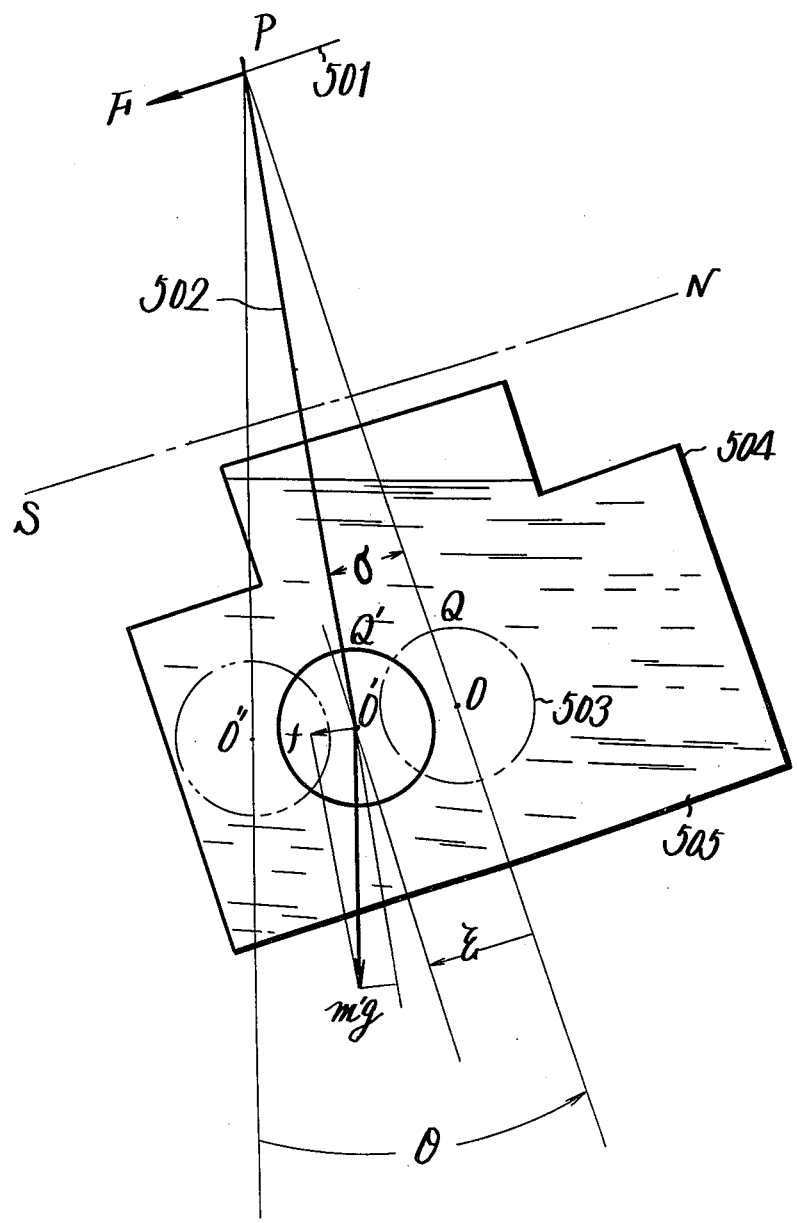

FIG. 12 is a diagram, for explaining the principle of the apparatus shown in FIGS. 11A and 11B. As the gyro is in its northseeking action, its north-seeking end is raised at an angle $\theta$ to a horizontal plane. A point P indicates the coupling point of the suspension band 502 and the gyro case 1, a point Q the coupling point of the weight 503 and the suspension band 502 and $\xi$ the distance between the center of the vessel 504 and the center of gravity of the weight 503. For the sake of brevity, let it be assumed that the suspension band 502 is completely flexible and the angle between a vertical axis PO and the suspension band 502 is taken as $\sigma$. The weight 503 receives downward (vertical) gravity $m'g$ and moves leftwards in the figure by a component $f$ of the gravity in the direction of spin axis so that $\sigma$ may agree with $\theta$, but the motion of the weight 503 is extremely damped by the viscosity resistance of the highly viscous damping liquid 505 and $\sigma$ is delayed in time relative to $\theta$. By the way, since the inclination angle $\theta$ remains very small throughout the northseeking action of the gyro, the effective weight $m'g$ of the weight 503 excepting the buoyancy of the damping liquid 505 acts as a tensile force on the suspension band 502 and this acts on the coupling point P of the suspension band 502 with the gyro case 1 and its component F in the direction of the spin axis serves as torque about the vertical axis. If the length of the suspension band 502 is taken as $a$ and the distance between the coupling point P and the vertical axis is taken as $r$, the component F is approximately $$r \times F = m'g\sigma r = m'g \frac{\xi}{a} \times r \quad (\sigma = \frac{\xi}{a})$$

and hence the torque about the vertical axis by the weight 503 is dependent on $\sigma$ or $\xi$.

The motion $\xi$ of the weight 503 relative to the vessel 504 in the direction of the spin axis is given by a component $f = m'g\theta$ of the gravity $m'g$ in the direction of the spin axis, the viscous resistance (a viscous resistance constant being taken as $c$) of the damping liquid 505 and a component $m'g\sigma = m'g\xi/a$ of the tensile force $m'g$ of the suspension band 502 in the direction of the spin axis. The motion is expressed in the following form:

$$c\dot{\xi} = m'g\theta - m'g \frac{\xi}{a}$$

in which the term of inertia is omitted because the term of the viscosity $c\dot{\xi}$ is extremely large. Changing the above equation, it follows that $$\frac{ac}{m'g} \dot{\xi} + \xi = a\theta$$

Using the Laplace operator $S$, it follows that $$\xi = \frac{a}{TS + 1} \theta$$

where $T = ac/m'g$: a time constant. Namely, $\xi$ or $\sigma$ is a function of first order lag of the gyro inclination angle $\theta$ and the torque about the vertical axis by the weight 503 becomes proportional to the first order lag of the gyro inclination angle $\theta$, that is, $$r' \times F = \frac{m'gr'}{TS + 1} \theta$$

While, both the torque by the weight 503 and that by the damping weight 500 act on the gyro about the vertical axis simultaneously as depicted in FIG. 13. As will be apparent from the figure, if the distance from the vertical axis is taken as $r$, the latter torque is $mgv \times r$ and its sign is opposite to that by the weight 503. After all, the torque $Q_D$ applied to the gyro about the vertical axis is as follows:

$$Q_D = mgr\theta - \frac{m'gr'}{TS + 1} \theta$$

and if $mgr = m'gr' = \mu$, it follows that $$Q_d = \mu \cdot \frac{TS}{TS + 1} \theta$$

which agrees with the aforesaid equation (7).

In other words, even if the gyro inclination angle $\theta$ exists during the north-seeking action of the gyro, the weight 503 is damped by the high viscosity of the damping liquid 505 and cannot move in the direction of the spin axis and $\xi$ is almost zero. Consequently, no torque is produced by the weight 503 about the vertical shaft but the damping weight 500 disposed on the west side of the gyro case 1 generates torque proportional to the gyro inclination angle $\theta$, so that the condition during the north-seeking action is substantially the same as that which would be obtained where only the damping weight 500 is provided and thus the north-seeking action is damped.

At the end of the north-seeking action, that is, when the gyro comes close to its resting condition, the weight 503 moves close to the vertical line, by which is generated torque equal in magnitude to that by the damping weight 500 but opposite in direction thereto to cancel each other. When the gyro has completely rested still, the torque produced by the damping weight 500 and that by the weight 503 completely coincide with each other in magnitude and no torque acts on the gyro about the vertical shaft.

FIG. 14 illustrates another example of this invention employing the mechanical method. This is a diagram showing the gyrocompass of FIG. 7 embodying this invention, as is the case with the example depicted in FIGS. 11A and 11B. In this figure, parts corresponding to those in FIGS. 11A and 11B are identified by the same reference numerals and no description thereof will be repeated for the sake of simplicity. The example of FIG. 14 is different from that of FIGS. 11A and 11B in that the damping weight 500 is not used, in that a mount 501' is secured to the vertical ring 200 and in that a vessel 504' containing a damping liquid 505' therein is mounted on the gyro case 1. Also in this case, the motion of the weight 503' relative to the vessel 504' in the direction of the spin axis based on the gyro inclination angle $\theta$ is exactly equivalent to that in the example of FIGS. 11A and 11B and if expressed by $\xi$, it is given as follows:

$$\xi = \frac{a}{TS+1} \cdot \theta$$

By the way, since the upper end of the suspension band 502' is fixed to the vertical ring, its tensile force does not act as torque about the vertical axis of the gyro. However, the vessel 504' is mounted on the gyro case 1, so that when the weight 503' moves in the direction of the spin axis (this is, perpendicular to the plane of the sheet) relative to the vessel 504', a viscous force substantially proportional to the velocity of the movement of the weight 503' acts through the damping liquid 504' on a position at a distance $r'$ apart from the vertical axis, by which torque about the vertical axis is applied to the gyro. The velocity of the weight 503' relative to the vessel 504' is differentiation of $\xi$ with respect to time and the torque $Q_D$ applied as a viscosity constant $cq$ about the vertical axis is given in the following form.

$$Q_d = \frac{car'S}{TS+1} \cdot \theta$$

$$= m'gr' \cdot \frac{TS}{TS+1} \cdot \theta$$

where the time contant $T = ac/m'g$. If $m'gr' = \mu$ as in the foregoing example, it follows that $$Q_D = \mu \cdot \frac{TS}{TS+1} \cdot \theta$$

Thus, this method also provides the characteristic given by the foregoing equation (7) and enables realization of the principle of this invention.

Briefly stated, the present invention is directed to the so-called vertical axis damping system that the north-seeking action of the gyro spin axis is damped by applying about the vertical axis of the gyro compass the torque $Q_D$ which is a function of the inclination angle $\theta$ of the gyro spin axis to a horizontal plane, and the invention is to provide means for holding the relation of the equation (5) or (7) between the damping torque $Q_D$ and the inclination angle $\theta$ of the gyro spin axis and it may be practised by various electrical and mechanical means.

Further, means for providing the same relation between $Q_D$ and $\theta$ as those given by the equations (5) and (7) based on the period of the north-seeking action of the gyrocompass in the means such as shown in FIG. 10C, in which the relation between $Q_D$ and $\theta$ is made a little different from those of the equations (5) and (7) as by the addition of a first order lag, all belong to this invention.

Namely, the transfer function between the inclination angle $\theta$ of the gyro spin axis and the damping torque $Q_D$ need not be limited specifically to the form $T_2S/T_1S + 1$) but, when it is written in the form of $f(S)/g(S)$, $f(S)$ can be in the form of $S \cdot f'(S)$, $g(S)$ has become a constant at the limit condition of $S$ being zero ($S \rightarrow 0$) and $f(S)/g(S)$ has a property similar to that of a constant with respect to the angle $\theta$ which varies on the cycle of the north-seeking action or a cycle close thereto. The forms of $f(S)/g(S)$ satisfying the above conditions can all be used as the transfer function of the damping device for the practice of this invention and they are all fall inside of the scope of the present invention.

It will be apparent that many modifications and variations may be effected without departing from the scope of the novel concepts of this invention.

We claim as our invention:

1. In a gyrocompass having a gyro rotor with a substantially horizontal spin axis, a gyro case for said gyro rotor, a support means for suspending the gyro case along a substantially vertical axis for north-seeking action, the improvement comprising means for applying a torque to said gyro rotor about said substantially vertical axis in proportion to the inclination angle of said spin axis from a horizontal plane to attenuate oscillatory action of said gyro rotor, means for detecting said inclination angle, circuit means intermediate of said detection means and the torque applying means for causing said torque to be applied to said gyro rotor at a repetition rate substantially equal to the north-seeking oscillatory rate of the gyro rotor, and means for causing said torque to approach zero as said north-seeking oscillatory action approaches a damped steady inclination angle.

2. A gyrocompass in accordance with claim 1 wherein said means for applying said torque comprises an electro mechanical transducer responsive to a time varying electrical signal for applying a torque to said gyro rotor, electronic circuit means for developing said time varying signal in response to the instantaneous position of said gyro rotor, said electronic circuit means including an amplifier having transfer function expressed as $f(S)/g(S)$ where $f(S)$ is expressed as $S \cdot f'(S)$ and $g(S)$ becomes a constant when $S$ approaches 0, said transfer function $f(S)/g(S)$ being a constant for an oscillation period of the north-seeking action of said gyrocompass.

3. A gyrocompass as claimed in claim 2 in which said transfer function is $T_2S/(T_1S + 1)$ where $T_1$ and $T_2$ are constant and $S$ is the Laplace operator.

4. In a gyrocompass having a gyro rotor, a gyro case for said gyro rotor, a support means for suspending the gyro case in the direction of gravity for north-seeking action, a servo means for causing said supporting means to track said gyro case about the direction of gravity, detection means for detecting a deviation angle of the gyro spin axis from a generally horizontal plane, circuit means coupled to an output of said detection means for developing a control signal to be applied to said servo means to produce an angular offset thereof, said circuit means having a transfer function for developing a signal to produce an offset substantially in proportion to the output of said detection means a component of said output which varies at a rate similar to the period of the north-seeking action of the gyro case and for producing a substantially zero offset for a constant level component of said output.

5. A gyrocompass as claimed in claim 4 in which said transfer function is expressed in the form of $f(S)/g(S)$ in which the numerator $f(S)$ must be expressed as $S \cdot f'(S)$ while the denominator $g(S)$ becomes a constant at the limit condition of $S$ being nearly zero ($S \rightarrow 0$), said transfer function $f(S)/g(S)$ acting as a constant for an oscillation period of the north-seeking action of said gyro case.

6. A gyrocompass as claimed in claim 5 in which said transfer function is $T_2S/(T_1S + 1)$ where $T_1$ and $T_2$ are constant and $S$ is the Laplace operator.

7. In a gyrocompass having a gyro rotor, a gyro case for said gyro rotor, a support means for suspending the gyro case for north-seeking action, means for detecting a deviation angle of the gyro spin axis from a horizontal plane, means for applying a torque to said gyro case about its vertical axis in accordance with the output of said detecting means, electronic transfer means for applying the output of said detecting means to said torque means, said transfer means causing said torque to be substantially in proportion to said detecting means output for a component thereof which varies with an oscillation period similar to that of the north-seeking action of the gyro case and also causing said torque to approach zero as said gyro rotor settles to a constant inclination angle.

8. A gyrocompass as claimed in claim 7 in which said transfer function is expressed in the form of $f(S)/g(S)$ in which the numerator $f(S)$ must be expressed as $S \cdot f'(S)$ while the denominator $g(S)$ becomes a constant at the limit condition of $S$ being nearly zero ($S \rightarrow 0$), said transfer function $f(S)/g(S)$ acting as a constant for an oscillation period of north-seeking action of said gyrocompass.

9. A gyrocompass as claimed in claim 8 in which said transfer function is $T_2S/(T_1S + 1)$ where $T_1$ and $T_2$ are constant and $S$ is the Laplace operator.

* * * * *